(12) United States Patent
Fukano et al.

(10) Patent No.: US 6,318,408 B1
(45) Date of Patent: Nov. 20, 2001

(54) DIRECTIONAL CONTROL VALVE (75) Inventors: Yoshihiro Fukano; Shoichi Makado, both of Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/543,547

(22) Filed: Apr. 5, 2000

(30) Foreign Application Priority Data

Apr. 14, 1999 (JP) ................................. 11-107253

(51) Int. Cl.$^7$ ...................................... F16K 11/02
(52) U.S. Cl. ................... 137/625.44; 137/625.65; 251/129.17; 251/129.2
(58) Field of Search ................ 137/625.44, 625.65; 251/129.17, 129.2

(56) References Cited

U.S. PATENT DOCUMENTS

| | | | |
|---|---|---|---|
| Re. 34,261 | * 5/1993 | Sule | 137/625.65 X |
| 5,337,785 | * 8/1994 | Romer | 137/625.44 X |
| 5,437,306 | * 8/1995 | Asou et al. | 137/625.64 |
| 5,462,087 | 10/1995 | Fukano et al. | |
| 5,555,911 | 9/1996 | Fukano et al. | |
| 5,586,570 | 12/1996 | Fukano et al. | |
| 5,983,941 | * 11/1999 | Fritz et al. | 137/625.65 |

* cited by examiner

*Primary Examiner*—Gerald A. Michalsky
(74) *Attorney, Agent, or Firm*—Oblon, Spivak, McClelland, Maier & Neustadt, P.C.

(57) ABSTRACT

A three-way valve comprises a valve body which is formed to have a rectangular parallelepiped-shaped configuration and which has a plurality of ports provided in juxtaposition on a first side surface having a narrow width, a solenoid section which is provided at the inside of a casing and which includes a fixed iron core, a movable iron core, and an electromagnetic coil, and a valve mechanism section provided with a diaphragm which is arranged coaxially with the solenoid section and which is displaceable in accordance with an exciting action on the electromagnetic coil to switch the communication state between the first to third ports.

31 Claims, 7 Drawing Sheets

DIRECTIONAL CONTROL VALVE

BACKGROUND OF THE INVENTION

1. Field of the Invention

The present invention relates to a directional control valve which makes it possible to control the flow direction of a pressure fluid.

2. Description of the Related Art

The directional control valve has been hitherto used in order to control the flow direction of the pressure fluid. Such a directional control valve includes, for example, a three-port solenoid-operated valve for operating a valve plug with a solenoid.

The three-port solenoid-operated valve has three ports including a pressure fluid supply port, an output port, and a discharge port. The pressure fluid supply port and the output port are formed coaxially respectively via a communication passage on opposing side surface portions of a casing. The discharge port is formed in a direction substantially perpendicular to an axis obtained by connecting the pressure fluid supply port and the output port. The valve plug for opening/closing the communication passage in accordance with the displacement action of the valve plug is arranged between the pressure fluid supply port and the output port. When the valve plug is separated from a seat section to open the communication passage, the pressure fluid supply port communicates with the output port.

In this-arrangement, for example, in the case of the solenoid-operated valve of the normally closed type, the output port communicates with the discharge port when the valve plug is seated on the seat section to give the valve-closed state. On the other hand, when the valve plug is separated from the seat section to give the valve-open state by attracting the valve plug in accordance with the electric power-applying action on the solenoid, the pressure fluid supply port communicates with the output port. As described above, in the case of the normally closed type solenoid-operated valve, the switching operation is performed between the communication state of the output port and the discharge port during no electric power application to the solenoid and the communication state of the pressure fluid supply port and the output port during the electric power application to the solenoid.

However, in the case of the three-port solenoid-operated valve concerning the conventional technique described above, it is necessary that the valve plug and the solenoid for attracting the valve plug are arranged between the pressure fluid supply port and the output port. Both ports are arranged mutually opposingly. Therefore, an inconvenience arises in that it is impossible to suppress the widthwise dimension along the connection of the pressure fluid supply port and the output port.

SUMMARY OF THE INVENTION

A general object of the present invention is to provide a directional control valve which makes it possible to realize a small size and a light weight of the entire apparatus by suppressing its dimension in the widthwise direction substantially perpendicular to the axis of a main valve body.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
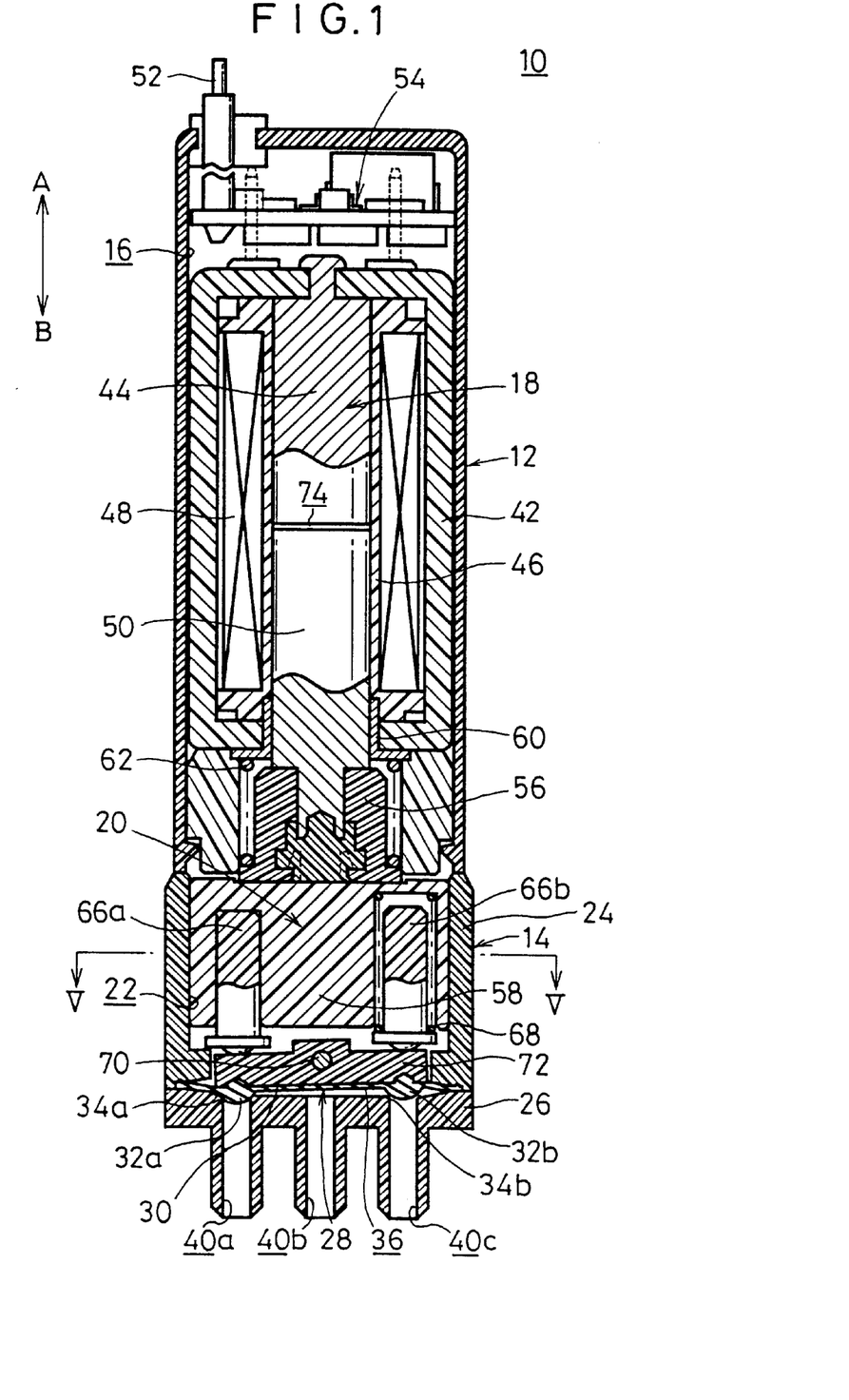
FIG. 1 shows a longitudinal sectional view taken along an axial direction of a three-way valve according to an embodiment of the present invention.

With reference to FIG. 1, reference numeral 10 indicates a three-way valve according to an embodiment of the present invention.

The three-way valve 10 has a casing 12 which is formed to have a bottom-equipped hollow rectangular parallelepiped-shaped configuration, and a valve body 14 which is integrally connected to the casing 12. The casing 12 and the valve body 14 function as a main valve body. A closed space 16 is formed at the inside of the casing 12 and the valve body 14. A solenoid section 18 and a valve mechanism section 20 are coaxially arranged closely to one another in the space 16.

Figure 2:
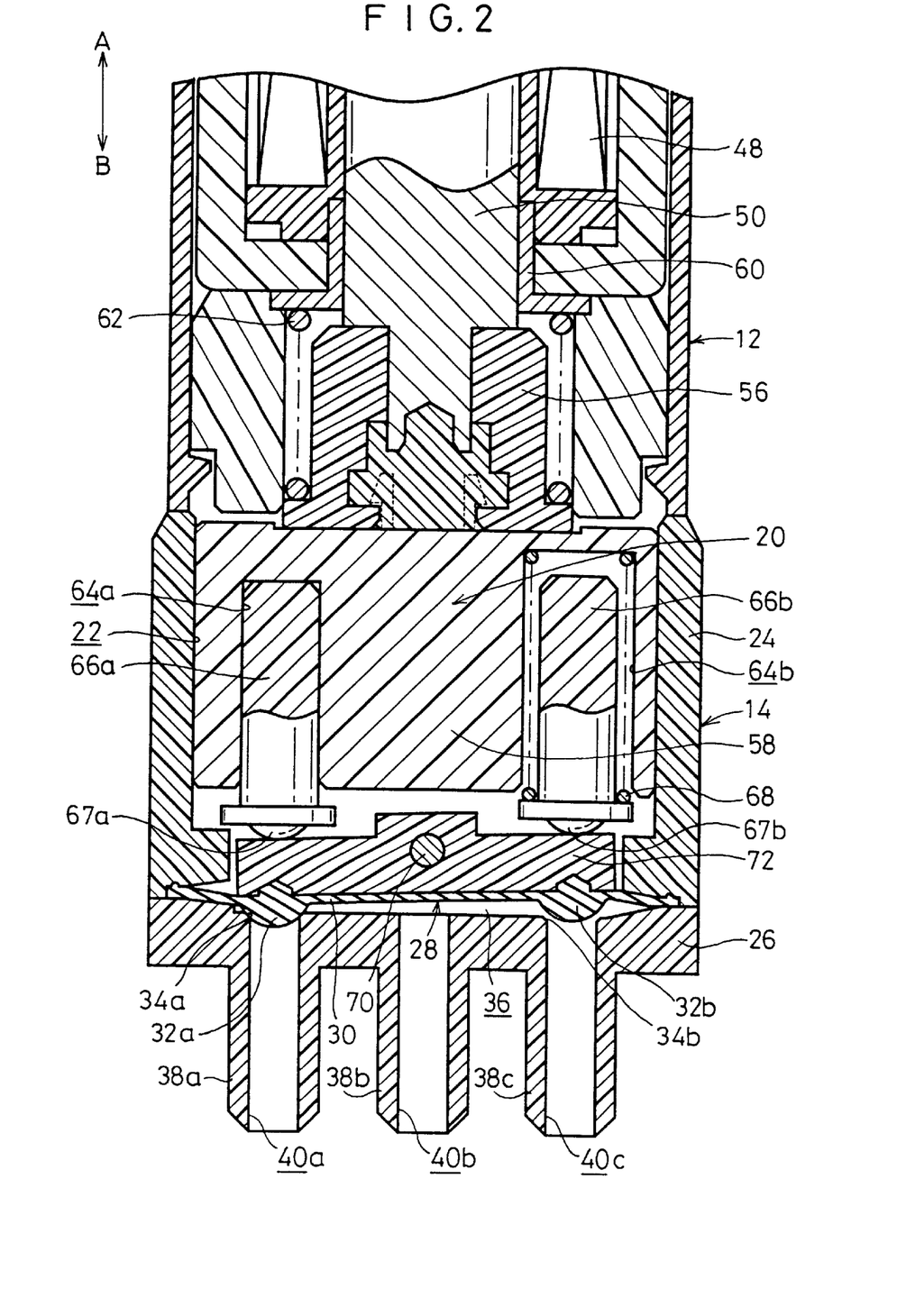
FIG. 2 shows a partial magnified longitudinal sectional view illustrating an initial state of the three-way valve.
Figure 3:
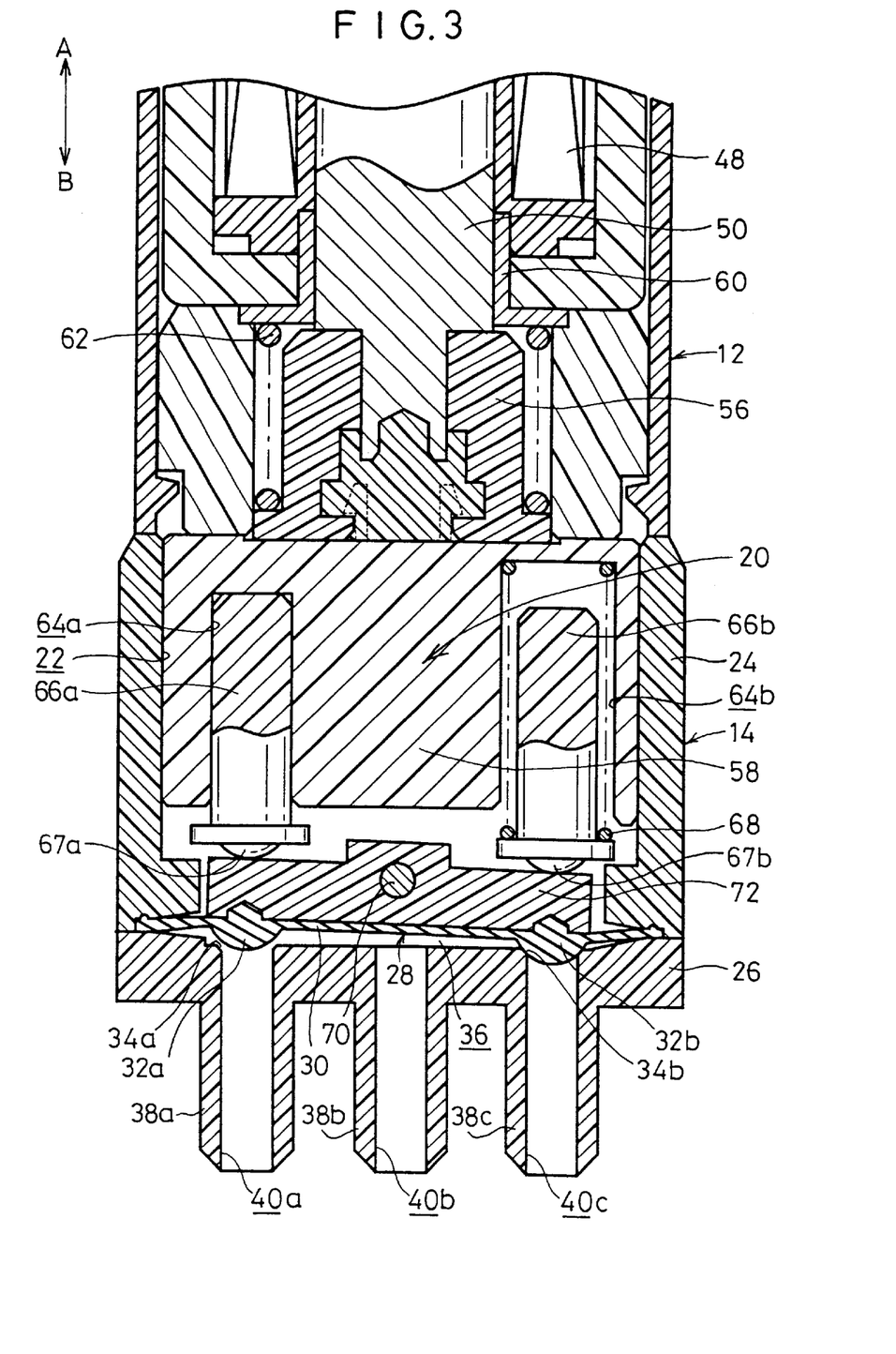
FIG. 3 shows a partial magnified longitudinal sectional view illustrating a state in which the valve position is changed from the initial state shown in FIG. 2.
Figure 4:
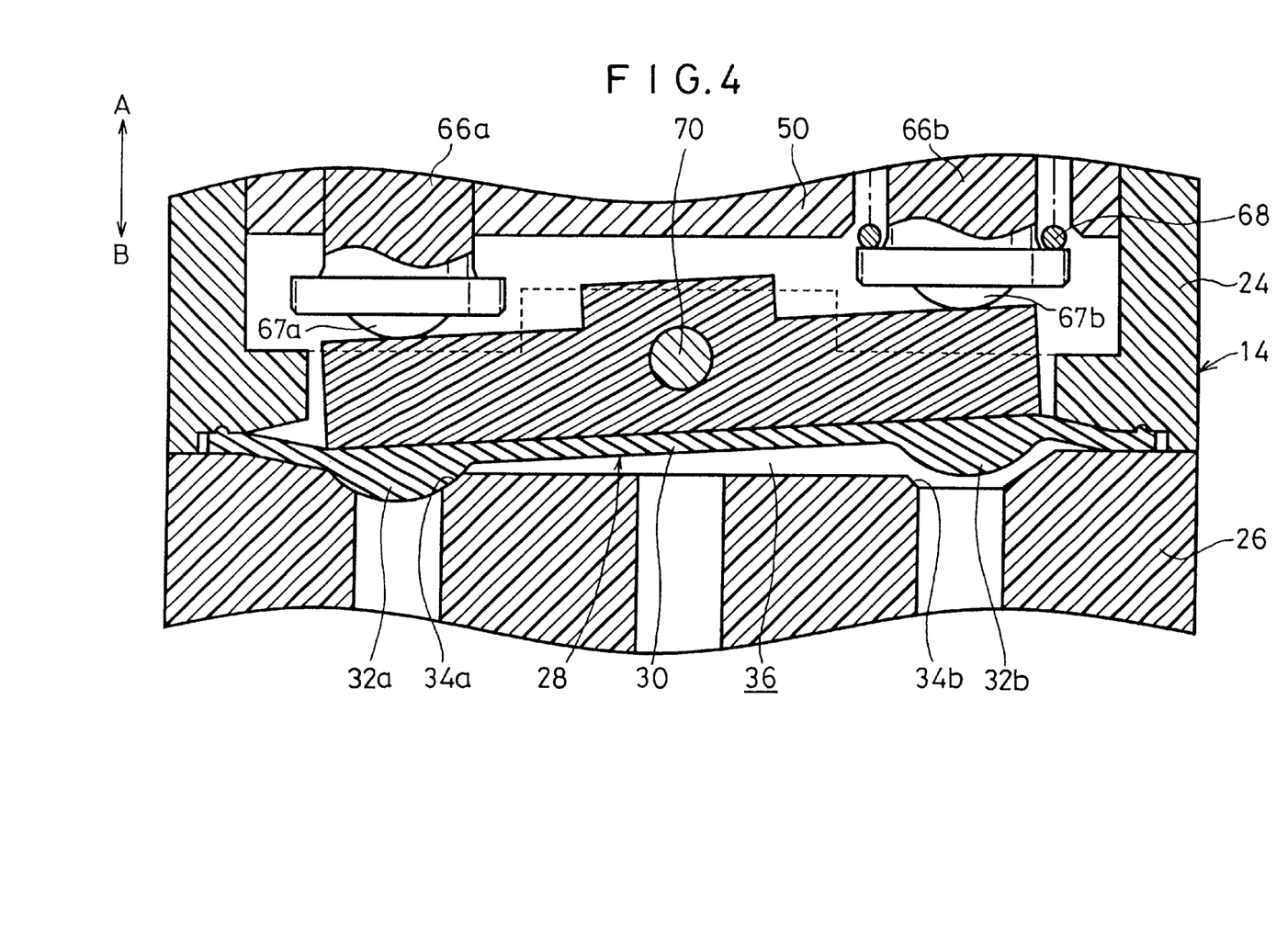
FIG. 4 shows a partial magnified longitudinal sectional view illustrating a structure of a diaphragm arranged at the inside of a valve body.
Figure 5:
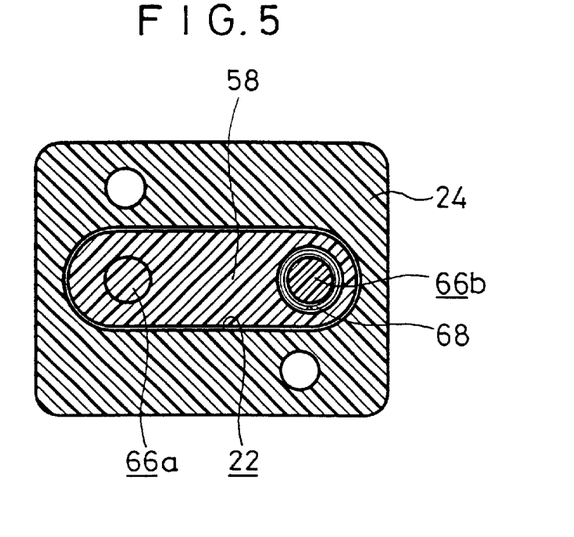
FIG. 5 shows a cross-sectional view taken along a line V—V shown in FIG. 1.

As shown in FIGS. 2 and 3, the valve body 14 comprises a block member 24 which has a substantially rectangular parallelepiped-shaped configuration with a hole 22 (see FIG. 5) having an elliptic cross section formed at a central portion, and a plate member 26 which is fixed to a bottom surface portion of the block member 24. An end edge of a diaphragm 28 is interposed at a connecting portion between the block member 24 and the plate member 26. As shown in FIG. 4, the diaphragm 28 has a flat thin-walled section 30 which is formed at a substantially central portion, and a first expanded section 32a and a second expanded section 32b which have a semispherical configuration and which are separated from each other by a predetermined spacing distance. The pair of first and second expanded sections 32a, 32b are designed such that they are seated on a first seat section 34a and a second seat section 34b formed on the plate member 26 respectively. The region between the first and second seat sections 34a, 34b is formed to give a substantially flat surface. A chamber 36 is formed between the diaphragm 28 and the plate member 26.

As shown in FIG. 4, each of the first and second seat sections 34a, 34b is formed by a tapered surface with its diameter which is gradually decreased downwardly (in the direction of the arrow B). However, each of the first and second seat sections 34a, 34b may be formed by a flat surface in place of the tapered surface.

As shown in FIG. 2, a first projection 38a, a second projection 38b, a third projection 38c, which have a cylindrical configuration and which protrude in the axial direction of the casing 12, are formed at the bottom of the plate member 26. First to third ports 40a to 40c are provided in juxtaposition on the first to third projections 38a to 38c via communication holes communicating with the chamber 36 respectively. The diaphragm 28 is preferably formed of, for example, silicon rubber or EPDM (ethylene-propylene-diene terpolymer).

As shown in FIG. 1, the solenoid section 18 includes a holding means 42 which is provided at the inside of the casing 12, a fixed iron core 44 which has a substantially columnar configuration and which is fixed to an upper surface portion of the holding means 42, an electromagnetic coil 48 which is externally fitted to the fixed iron core 44 with a coil wound in a plurality of turns via a bobbin 46, and a movable iron core 50 which is provided displaceably along a hole formed in the bobbin 46 with a predetermined clearance provided with respect to a first end of the fixed iron core 44 in the axial direction. The electric power is applied to the electromagnetic coil 48 via a lead wire 52 connected to an unillustrated power source. A circuit board 54 is arranged between the lead wire 52 and the electromagnetic coil 48.

As shown in FIGS. 2 and 3, the valve mechanism section 20 includes a displacement member 58 which is coaxially connected to the first end of the movable iron core 50 via a coupling member 56 and which is displaceable integrally with the movable iron core 50 along the hole 22 having the elliptic cross section, and a first spring member 62 which is fastened between the coupling member 56 and a receiving member 60, for urging the displacement member 58 downwardly (in the direction of the arrow B) in accordance with the action of the resilient force.

A pair of holes 64a, 64b, which have different diameters and which are separated from each other by a predetermined spacing distance to extend in the axial direction, are formed in the displacement member 58. A first pressing member 66a having a substantially columnar configuration is inserted and fitted into the first hole 64a having the smaller diameter. A second pressing member 66b having a substantially columnar configuration is loosely fitted via a gap to the second hole 64b having the large diameter. The respective axes of the first pressing member 66a and the second pressing member 66b are designed such that they are substantially parallel to the axis of the movable iron core 50 and the displacement member 58 and they are separated from the axis by an identical distance. Substantially hemispherical expanded sections 67a, 67b are formed at first ends of the first and second pressing members 66a, 66b protruding from the holes 64a, 64b of the displacement member 58 respectively.

The gap is formed between the outer circumferential surface of the second pressing member 66b and the wall surface of the hole 64b. A second spring member 68 for pressing the second pressing member 66b downwardly (in the direction of the arrow B) is arranged in the gap. The resilient force (spring force) of the second spring member 68 is set to be about a half of that of the first spring member 62. swinging member 72, which makes swinging displacement by a predetermined angle about a supporting point of a shaft member 70 supported by the block member 24 for rotation, is arranged under the displacement member 58. The shaft member 70 is attached for rotation at a substantially central portion of the swinging member 72 formed to have a flat plate configuration. The expanded sections 67a, 67b of the first pressing member 66a and the second pressing member 66b, which are separated from each other by the predetermined spacing distance, make point-to-point contact with the substantially flat upper surface of the swinging member 72 respectively. The diaphragm 28, which functions as a valve plug, is secured to the bottom surface of the swinging member 72.

In this arrangement, as shown in FIG. 2, the swinging member 72 is inclined slanting downward to the left about the supporting point of the shaft member 70 in accordance with the pressing action of the first pressing member 66a, and the first expanded section 32a is seated on the first seat section 34a. Thus, the first port 40a is closed to give a communication state between the second port 40b and the third port 40c. On the other hand, as shown in FIG. 3, the swinging member 72 is inclined slanting downward to the right about the supporting point of the shaft member 70 in accordance with the pressing action of the second pressing member 66b, and the second expanded section 32b is seated on the second seat section 34b. Thus, the third port 40c is closed to give a communication state between the first port 40a and the second port 40b. As described above, the communication state between the second port 40b and the third port 40c and the communication state between the first port 40a and the second port 40b are mutually switched to one another in accordance with the swinging action of the swinging member 72.

The three-way valve 10 according to the embodiment of the present invention is basically constructed as described above. Next, its operation, function, and effect will be explained.

For example, an unillustrated tube is previously installed to the first projection 38a to communicate and connect the first port 40a and an unillustrated washing solution supply source. An unillustrated tube is previously installed to the third projection 38c to communicate the third port 40c and an unillustrated liquid supply source. An unillustrated tube is previously installed to the second projection 38b to communicate and connect the second port 40b and an unillustrated fluid pressure-operated apparatus.

As shown in FIG. 1, when no electric power is applied to the electromagnetic coil 48, the fixed iron core 44 is separated from the movable iron core 50 to form a predetermined clearance 74 therebetween. The swinging member 72 is inclined slanting downward to the left, and thus the first expanded section 32a is seated on the first seat section 34a. Accordingly, the first port 40a is closed, and the second port 40b and the third port 40c are in the communication state. The following description will be made assuming that this state is the initial state.

In the initial state shown in FIG. 2, the unillustrated liquid is supplied from the third port 40c, and it is discharged from the second port 40b via the chamber 36, giving a state in which the liquid is supplied to the unillustrated fluid pressure-operated apparatus.

The unillustrated power source is energized to allow a current to flow through the electromagnetic coil 48. Accordingly, the electromagnetic coil 48 is excited. The movable iron core 50 is attracted toward the fixed iron core 44 (in the direction of the arrow A) in accordance with the attractive force generated by the exciting action of the electromagnetic coil 48. Therefore, the displacement member 58 is displaced by a predetermined spacing distance upwardly (in the direction of the arrow A) integrally with the movable iron core 50 against the resilient force of the first spring member 62. Accordingly, the force to press the first end side of the swinging member 72 by the first pressing member 66a is decreased. Simultaneously, the force to press the second end side of the swinging member 72 by the second spring member 68 fastened to the second pressing member 66b is increased.

During this process, the swinging member 72 makes the swinging movement about the supporting point of the shaft member 70 from the state slanting downward to the left to the state slanting downward to the right. The second expanded section 32b is seated on the second seat section 34b to close the third port 40c, giving the state in which the first port 40a communicates with the second port 40b. Therefore, the third port 40c for supplying the liquid is closed. The washing solution, which is supplied via the first port 40a, is introduced into the fluid pressure-operated apparatus via the chamber 36 and the second port 40b.

Next, explanation will be made for the operation to stop the supply of the washing solution and introduce the liquid into the fluid pressure-operated apparatus.

When the electric power application to the electromagnetic coil 48 is stopped, the attractive force for the movable iron core 50 disappears. The movable iron core 50 and the displacement member 58 are displaced downwardly (in the direction of the arrow B) in accordance with the resilient force of the first spring member 62. In this process, the force, which is exerted to press the movable iron core 50 and the displacement member 58 in the direction of the arrow B in accordance with the resilient force of the first spring member 62, is divided substantially equivalently, and it is given to the first pressing member 66a and the second pressing member 66b provided in the displacement member 58. The force, which is exerted to press the first end side of the swinging member 72 by the first pressing member 66a, overcomes the resilient force of the second spring member 68 fastened to the second pressing member 66b. Accordingly, the swinging member 72 makes the swinging displacement by a predetermined angle about the center of the shaft member 70 to restore the initial state.

In the embodiment of the present invention, the first to third ports 40a to 40c are provided in juxtaposition on the first side surface having the narrow width of the valve body 14. The movable iron core 50, the displacement member 58, and the swinging member 72 are arranged coaxially.

Thus, it is possible to suppress the dimension in the widthwise direction and realize a small size of the entire apparatus.

The other constitutive elements except for, for example, the fixed iron core 44 and the movable iron core 50 are formed of the resin material. Accordingly, it is possible to realize a light weight of the entire apparatus.

Further, the hemispherical first and second expanded sections 32a, 32b are formed on the diaphragm 28. The first and second expanded sections 32a, 32b are seated on the first and second seat sections 34a, 34b respectively. Accordingly, the sealing performance is improved, and it is possible to make the seal in a reliable manner.

Each of the first seat section 34a and the second seat section 34b is formed by the tapered surface, or each of them is formed by the substantially flat surface. Accordingly, it is possible to avoid occurrence of any liquid pool at a region in the vicinity of the seat section.

Next, a three-way valve 80 according to another embodiment of the present invention is shown in FIGS. 6 to 9.

Figure 6:
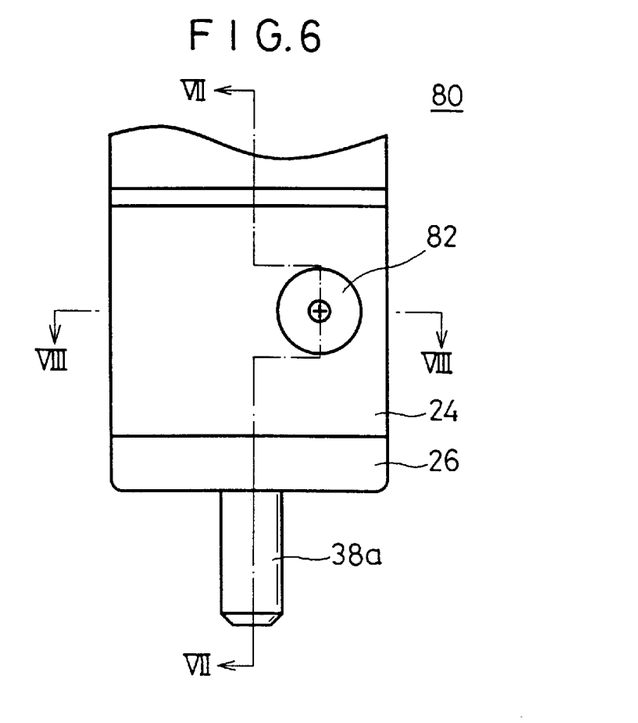
FIG. 6 shows, with partial omission, a side view illustrating a three-way valve according to another embodiment of the present invention.
Figure 7:
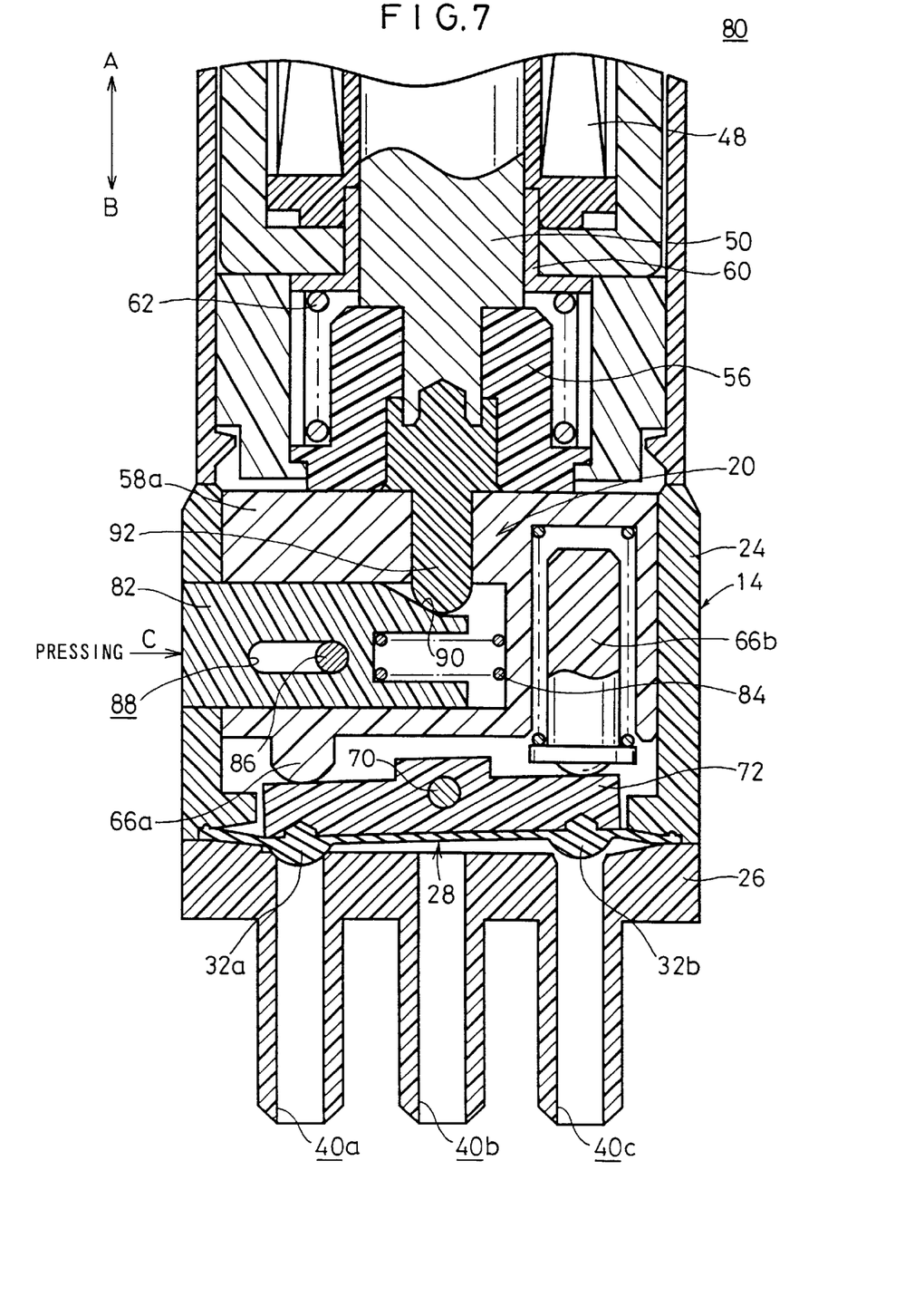
FIG. 7 shows a longitudinal sectional view taken along a line VII—VII shown in FIG. 6.
Figure 8:
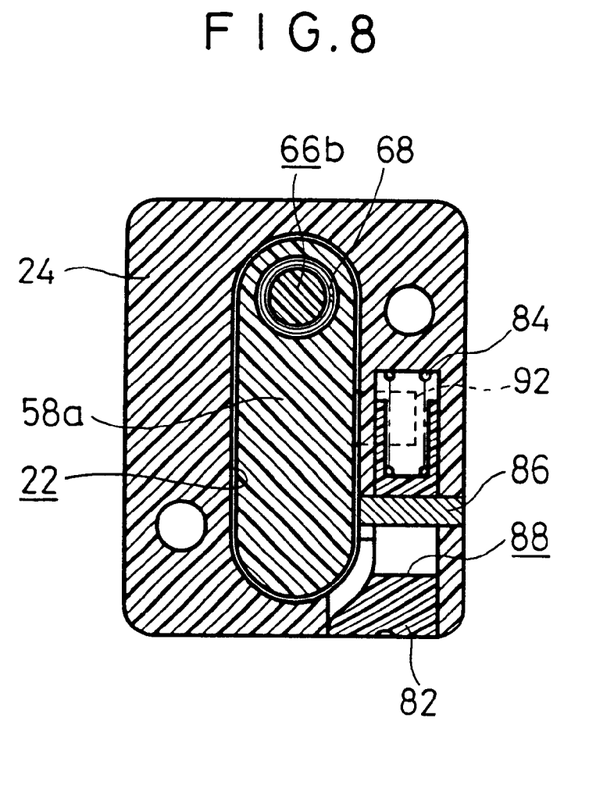
FIG. 8 shows a cross-sectional view taken along a line VIII—VIII shown in FIG. 6.

The three-way valve 80 according to the another embodiment has the following feature. That is, a lever 82, which extends in a direction substantially perpendicular to the axis, is provided. When the lever 82 is manually pressed, the swinging member 72 successfully makes swinging displacement to switch the valve position.

In other words, when the lever 82 is manually pressed against the resilient force of the spring member 84, the lever 82 is displaced in the direction of the arrow C by the aid of a long hole 88 engaged with a pin 86. During this process, a projection 92 is pressed upwardly by an inclined surface 90 of the lever 82. The displacement member 58a, which is formed integrally with the projection 92, is displaced upwardly (in the direction of the arrow A). Accordingly, the swinging member 72 makes the swinging displacement, and thus the valve position is switched.

As described above, in the three-way valve 80 according to the another embodiment, the valve position can be switched in accordance with the manual operation. Therefore, the three-way valve 80 according to the another embodiment is advantageous in that it is especially convenient when the current for the electromagnetic coil 48 is broken due to power interruption or the like, or when the maintenance operation is performed.

The other function and effect are the same as those of the embodiment described above, detailed explanation of which is omitted.

Additionally, the embodiments of the present invention have been explained with the three-way valves 10, 80, however, there is no limitation thereto. It is a matter of course that the present invention is applicable to a variety of directional control valves.

What is claimed is:
1. A directional control valve comprising:
   a main valve body having, on a first side surface, a plurality of ports;
   a solenoid section provided at the inside of said main valve body and including a fixed iron core, a movable iron core, and a coil; and
   a valve mechanism section provided with a valve plug arranged coaxially with said solenoid section at the inside of said main valve body, for switching communication states of said plurality of ports by making displacement in accordance with an exciting action on said coil,
      wherein said valve mechanism section includes a displacement member connected to a first end of said movable iron core, a first spring member for pressing said displacement member toward said plurality of ports, a first pressing member and a second pressing member provided substantially in parallel to an axis of said displacement member, a second spring member fastened to said second pressing member, and a swinging member for being engaged with said first pressing member at a first end side and being engaged with said second pressing member at a second end side, said swinging member making swinging displacement about a supporting point of a shaft member attached at a central portion for rotation, and
      wherein said first pressing member is fitted to a hole of said displacement member to make displacement in an integrated manner, and said second pressing member is loosely fitted to a hole of said displacement member via a second spring member.

2. The directional control valve according to claim 1, wherein said fixed iron core, said displacement member, and said swinging member are arranged coaxially respectively.

3. The directional control valve according to claim 1, wherein said first pressing member and said second pressing member extend substantially in parallel to said axis of said displacement member, and they are arranged by being separated from each other by equal spacing distances with said axis of said displacement member disposed therebetween.

4. The directional control valve according to claim 1, wherein said second spring member is set to have a spring force which is substantially a half of that of said first spring member.

5. The directional control valve according to claim 1, wherein said plurality of ports are arranged linearly by being separated from each other by equal spacing distances on said first side surface having a narrow width of said main valve body.

6. The directional control valve according to claim 5, wherein said plurality of ports include a first port arranged on a first end side of said first surface, a second port arranged at a substantially central portion, and a third port arranged on a second end side, and a communication state between said first port and said second port and a communication state between said second port and said third port are mutually switchable in accordance with an urging action of said valve mechanism section.

7. The directional control valve according to claim 1, wherein hemispherical expanded sections are formed at first ends in said axial direction of said first pressing member and said second pressing member respectively, and said expanded sections are provided so that they make point-to-point contact with a flat surface portion of said swinging member.

8. The directional control valve according to claim 1, wherein a switching mechanism for switching a valve position of said valve plug by means of manual operation is provided for said main valve body.

9. The directional control valve according to claim 8, wherein said switching mechanism includes a lever provided displaceably in a direction substantially perpendicular to said axis of said main valve body, a projection for displacing said movable iron core toward said fixed iron core by making engagement with an inclined surface formed on said lever, and a pin for supporting said lever to serve as a shaft.

10. The directional control valve according to claim 1, wherein said valve plug is composed of a diaphragm secured to said swinging member for making swinging movement integrally with said swinging member, and said diaphragm is provided with a first expanded section and a second expanded section each having a hemispherical configuration for being seated on a first seat section and a second seat section respectively.

11. A directional control valve comprising:
a main valve body having, on a first side surface, a plurality of ports;
a solenoid section provided at the inside of said main valve body and including a fixed iron core, a movable iron core, and a coil; and
a valve mechanism section provided with a valve plug arranged coaxially with said solenoid section at the inside of said main valve body, for switching communication states of said plurality of ports by making displacement in accordance with an exciting action on said coil, wherein said valve mechanism section includes a displacement member connected to a first end of said movable iron core, a first spring member for pressing said displacement member toward said plurality of ports, a first pressing member and a second pressing member provided substantially in parallel to an axis of said displacement member, a second spring member fastened to said second pressing member, and a swinging member for being engaged with said first pressing member at a first end side and being engaged with said second pressing member at a second end side, said swinging member making swinging displacement about a supporting point of a shaft member attached at a central portion for rotation, and
wherein hemispherical expanded sections are formed at first ends in said axial direction of said first pressing member and said second pressing member respectively, and said expanded sections are provided so that they make point-to-point contact with a flat surface portion of said swinging member.

12. The directional control valve according to claim 11, wherein said fixed iron core, said displacement member, and said swinging member are arranged coaxially respectively.

13. The directional control valve according to claim 11, wherein said first pressing member and said second pressing member extend substantially in parallel to said axis of said displacement member, and they are arranged by being separated from each other by equal spacing distances with said axis of said displacement member disposed therebetween.

14. The directional control valve according to claim 11, wherein said second spring member is set to have a spring force which is substantially a half of that of said first spring member.

15. The directional control valve according to claim 11, wherein said plurality of ports are arranged linearly by being separated from each other by equal spacing distances on said first side surface having a narrow width of said main valve body.

16. The directional control valve according to claim 15, wherein said plurality of ports include a first port arranged on a first end side of said first surface, a second port arranged at a substantially central portion, and a third port arranged on a second end side, and a communication state between said first port and said second port and a communication state between said second port and said third port are mutually switchable in accordance with an urging action of said valve mechanism section.

17. The directional control valve according to claim 11, wherein said first pressing member is fitted to a hole of said displacement member to make displacement in an integrated manner, and said second pressing member is loosely fitted to a hole of said displacement member via a second spring member.

18. The directional control valve according to claim 11, wherein a switching mechanism for switching a valve position of said valve plug by means of manual operation is provided for said main valve body.

19. The directional control valve according to claim 18, wherein said switching mechanism includes a lever provided displaceably in a direction substantially perpendicular to said axis of said main valve body, a projection for displacing said movable iron core toward said fixed iron core by making engagement with an inclined surface formed on said lever, and a pin for supporting said lever to serve as a shaft.

20. The directional control valve according to claim 11, wherein said valve plug is composed of a diaphragm secured to said swinging member for making swinging movement integrally with said swinging member, and said diaphragm is provided with a first expanded section and a second expanded section each having a hemispherical configuration for being seated on a first seat section and a second seat section respectively.

21. A directional control valve comprising: a main valve body having, on a first side surface, a plurality of ports;

a solenoid section provided at the inside of said main valve body and including a fixed iron core, a movable iron core, and a coil; and a valve mechanism section provided with a valve plug arranged coaxially with said solenoid section at the inside of said main valve body, for switching communication states of said plurality of ports by making displacement in accordance with an exciting action on said coil, wherein said valve mechanism section includes a displacement member connected to a first end of said movable iron core, a first spring member for pressing said displacement member toward said plurality of ports, a first pressing member and a second pressing member provided substantially in parallel to an axis of said displacement member, a second spring member fastened to said second pressing member, a shaft member, and a swinging member for being engaged with said first pressing member at a first end side and being engaged with said second pressing member at a second end side, said swinging member making swinging displacement about a single supporting point, said shaft member being attached at a central portion of said swinging member defining said single supporting point.

22. The directional control valve according to claim 21, wherein said fixed iron core, said displacement member, and said swinging member are arranged coaxially respectively.

23. The directional control valve according to claim 21, wherein said first pressing member and said second pressing member extend substantially in parallel to said axis of said displacement member, and they are arranged by being separated from each other by equal spacing distances with said axis of said displacement member disposed therebetween.

24. The directional control valve according to claim 21, wherein said second spring member is set to have a spring force which is substantially a half of that of said first spring member.

25. The directional control valve according to claim 21, wherein said plurality of ports are arranged linearly by being separated from each other by equal spacing distances on said first side surface having a narrow width of said main valve body.

26. The directional control valve according to claim 25, wherein said plurality of ports include a first port arranged on a first end side of said first surface, a second port arranged at a substantially central portion, and a third port arranged on a second end side, and a communication state between said first port and said second port and a communication state between said second port and said third port are mutually switchable in accordance with an urging action of said valve mechanism section.

27. The directional control valve according to claim 21, wherein hemispherical expanded sections are formed at first ends in said axial direction of said first pressing member and said second pressing member respectively, and said expanded sections are provided so that they make point-to-point contact with a flat surface portion of said swinging member.

28. The directional control valve according to claim 21, wherein said first pressing member is fitted to a hole of said displacement member to make displacement in an integrated manner, and said second pressing member is loosely fitted to a hole of said displacement member via a second spring member.

29. The directional control valve according to claim 21, wherein a switching mechanism for switching a valve position of said valve plug by means of manual operation is provided for said main valve body.

30. The directional control valve according to claim 27, wherein said switching mechanism includes a lever provided displaceably in a direction substantially perpendicular to said axis of said main valve body, a projection for displacing said movable iron core toward said fixed iron core by making engagement with an inclined surface formed on said lever, and a pin for supporting said lever to serve as a shaft.

31. The directional control valve according to claim 21, wherein said valve plug is composed of a diaphragm secured to said swinging member for making swinging movement integrally with said swinging member, and said diaphragm is provided with a first expanded section and a second expanded section each having a hemispherical configuration for being seated on a first seat section and a second seat section respectively.

* * * * *